US009858472B2

(12) United States Patent
Ming et al.

(10) Patent No.: US 9,858,472 B2
(45) Date of Patent: Jan. 2, 2018

(54) THREE-DIMENSIONAL FACIAL RECOGNITION METHOD AND SYSTEM

(71) Applicant: TENCENT TECHNOLOGY (SHENZHEN) COMPANY LIMITED, Shenzhen (CN)

(72) Inventors: Yue Ming, Shenzhen (CN); Jie Jiang, Shenzhen (CN); Tingting Liu, Shenzhen (CN); Juhong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/212,410

(22) Filed: Jul. 18, 2016

(65) Prior Publication Data
US 2016/0328601 A1    Nov. 10, 2016

Related U.S. Application Data

(63) Continuation of application No. PCT/CN2015/077280, filed on Apr. 23, 2015.

(30) Foreign Application Priority Data

Apr. 25, 2014   (CN) .......................... 2014 1 0171665

(51) Int. Cl.
G06K 9/00   (2006.01)
G06K 9/46   (2006.01)
(52) U.S. Cl.
CPC ..... G06K 9/00248 (2013.01); G06K 9/00281 (2013.01); G06K 9/00288 (2013.01); G06K 9/4671 (2013.01); *G06K 9/4676* (2013.01)

(58) Field of Classification Search
CPC ........... G06K 9/00248; G06K 9/00281; G06K 9/4671; G06K 9/00288; G06K 9/00228; G06K 9/00222; G06K 9/00287
See application file for complete search history.

(56) References Cited

U.S. PATENT DOCUMENTS

2002/0102010 A1   8/2002  Liu et al.
2005/0180626 A1*  8/2005  Moon ................ G06K 9/00248
                                              382/159

(Continued)

FOREIGN PATENT DOCUMENTS

CN        101101672 A      1/2008

OTHER PUBLICATIONS

The World Intellectual Property Organization (WIPO) International Search Report for PCT/CN2015/077280 dated Jul. 21, 2015 p. 1-3.

(Continued)

*Primary Examiner* — Amir Alavi
(74) *Attorney, Agent, or Firm* — Anova Law Group, PLLC

(57) ABSTRACT

The present disclosure provides a three-dimensional facial recognition method and system. The method includes: performing pose estimation on an input binocular vision image pair by using a three-dimensional facial reference model, to obtain a pose parameter and a virtual image pair of the three-dimensional facial reference model with respect to the binocular vision image pair; reconstructing a facial depth image of the binocular vision image pair by using the virtual image pair as prior information; detecting, according to the pose parameter, a local grid scale-invariant feature descriptor corresponding to an interest point in the facial depth image; and generating a recognition result of the binocular vision image pair according to the detected local grid scale-invariant feature descriptor and training data having (Continued)

attached category annotations. The present disclosure can reduce computational costs and required storage space.

18 Claims, 12 Drawing Sheets

(56) References Cited

U.S. PATENT DOCUMENTS

| | | |
|---|---|---|
| 2007/0122001 A1 | 5/2007 | Wang et al. |
| 2009/0158309 A1* | 6/2009 | Moon ................ G06K 9/00778 725/12 |
| 2010/0214289 A1 | 8/2010 | Xiao et al. |
| 2015/0178554 A1* | 6/2015 | Kanaujia ................ G06T 19/20 382/118 |
| 2016/0070952 A1* | 3/2016 | Kim .................... G06K 9/00208 382/118 |
| 2016/0328601 A1* | 11/2016 | Ming ................ G06K 9/00248 |
| 2016/0335487 A1* | 11/2016 | Ming ................ G06K 9/00335 |
| 2016/0371539 A1* | 12/2016 | Ming ................ G06K 9/00268 |

OTHER PUBLICATIONS

Yue Ming, Xiaopeng Hong, A unified 3D face authentication framework based on robust local mesh SIFT feature, Neurocomputing, Dec. 11, 2015, p. 117-130, vol. 184, Elsevier.

* cited by examiner

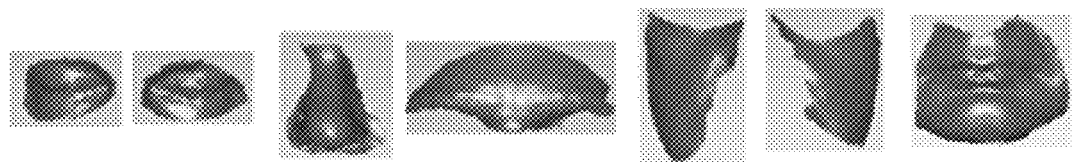

FIG. 9

```
                                    ┌── S151
┌─────────────────────────────────────┐
│ Perform calculation on the plurality of facial regions │
│ obtained during the image segmentation, to obtain     │
│ three-dimensional facial grids included in the facial │
│ regions                                               │
└─────────────────────────────────────┘
                    │
                    ▼              ┌── S153
┌─────────────────────────────────────┐
│ Detect interest points in the three-dimensional facial │
│ grids                                                 │
└─────────────────────────────────────┘
                    │
                    ▼              ┌── S155
┌─────────────────────────────────────┐
│ Calculate, according to the pose parameter of the     │
│ binocular vision image pair, local grid scale-invariant│
│ feature descriptors corresponding to the detected     │
│ interest points                                       │
└─────────────────────────────────────┘
```

FIG. 10

THREE-DIMENSIONAL FACIAL RECOGNITION METHOD AND SYSTEM

CROSS-REFERENCES TO RELATED APPLICATIONS

This application is a continuation application of PCT Patent Application No. PCT/CN2015/077280, filed on Apr. 23, 2015, which claims priority to Chinese Patent Application No. 201410171665.9, entitled "THREE-DIMENSIONAL FACIAL RECOGNITION METHOD AND SYSTEM" filed on Apr. 25, 2014, the entire contents of both of which are incorporated herein by reference. This application further incorporates by reference the entirety of "A Unified 3D Face Authentication Framework based on Robust Local Mesh SIFT Feature" by Ming, Y. and Hong, X., published on Dec. 11, 2015, in *Neurocomputing*, Volume 184, Pages 117-130.

FIELD OF THE TECHNOLOGY

The present disclosure relates to facial image processing technologies, and in particular, to a three-dimensional facial recognition method and system.

BACKGROUND OF THE DISCLOSURE

Three-dimensional data processing has always been a challenging issue in aspects of computer vision and computer graphics, and face analysis and recognition has become an important branch in the three-dimensional data processing.

With the development of facial recognition technologies, two-dimensional face recognition has achieved high accuracy. However, grayscale images used in the two-dimensional face recognition still fail to implement accurate recognition in extreme application scenarios, and moreover, considering the deficiency of the two-dimensional face recognition, a low-cost three-dimensional acquisition apparatus is further used to enhance the performance of the face recognition; in other words, a facial recognition technology combining three-dimensional facial data and two-dimensional facial data is put forward, to improve the effectiveness and accuracy of face recognition.

However, the facial recognition technology combining three-dimensional facial data and two-dimensional facial data needs high computational costs and large storage space, which is unfavorable to widespread use of the facial recognition technology.

SUMMARY

Accordingly, it is necessary to provide a three-dimensional facial recognition method that can reduce computational costs and required storage space, to solve the foregoing technical problem.

In addition, a three-dimensional facial recognition system that can reduce computational costs and required storage space is also provided.

A three-dimensional facial recognition method includes the following steps: performing pose estimation on an input binocular vision image pair by using a three-dimensional facial reference model, to obtain a pose parameter and a virtual image pair of the three-dimensional facial reference model with respect to the binocular vision image pair; reconstructing a facial depth image of the binocular vision image pair by using the virtual image pair as prior information; detecting, according to the pose parameter, a local grid scale-invariant feature descriptor corresponding to an interest point in the facial depth image; and generating a recognition result of the binocular vision image pair according to the detected local grid scale-invariant feature descriptor and training data having attached category annotations.

A three-dimensional facial recognition system includes: an input image processing module, configured to perform pose estimation on an input binocular vision image pair by using a three-dimensional facial reference model, to obtain a pose parameter and a virtual image pair of the three-dimensional facial reference model with respect to the binocular vision image pair; an image reconstruction module, configured to reconstruct a facial depth image of the binocular vision image pair by using the virtual image pair as prior information; a detection module, configured to detect, according to the pose parameter, a local grid scale-invariant feature descriptor corresponding to an interest point in the facial depth image; and a result generating module, configured to generate a recognition result of the binocular vision image pair according to the detected local grid scale-invariant feature descriptor and training data having attached category annotations.

In the foregoing three-dimensional facial recognition method and system, pose estimation is performed on an input binocular vision image pair by using a three-dimensional facial reference model, to obtain a pose parameter and a virtual image pair of the three-dimensional facial reference model with respect to the binocular vision image pair; a facial depth image of the binocular vision image pair is reconstructed by using the virtual image pair as prior information; a local grid scale-invariant feature descriptor corresponding to an interest point in the facial depth image is detected according to the pose parameter; and further, a recognition result of the binocular vision image pair is generated according to the detected local grid scale-invariant feature descriptor and training data having attached category annotations. Because the local grid scale-invariant feature descriptor is a feature descriptor with invariant scale and rotation, interference from a complex background and an extreme application scenario can be eliminated effectively, and computational costs and required storage space can be reduced, thereby effectively improving the robustness and consistency of three-dimensional face recognition.

Other aspects of the present disclosure can be understood by those skilled in the art in light of the description, the claims, and the drawings of the present disclosure.

BRIEF DESCRIPTION OF THE DRAWINGS

FIG. 9 is a schematic diagram of a plurality of facial regions obtained by performing facial segmentation in an embodiment;

FIG. 10 is a flowchart of a method of detecting, according to the pose parameter, a local grid scale-invariant feature descriptor corresponding to an interest point in the facial depth image in FIG. 1;

DESCRIPTION OF EMBODIMENTS

To make the objectives, technical solutions and advantages of the present disclosure clearer, the present disclosure is described in further detail below with reference to the accompanying drawings and embodiments. It should be understood that the specific embodiments described herein are merely for illustrating the present disclosure but not intended to limit the present disclosure.

Figure 1:
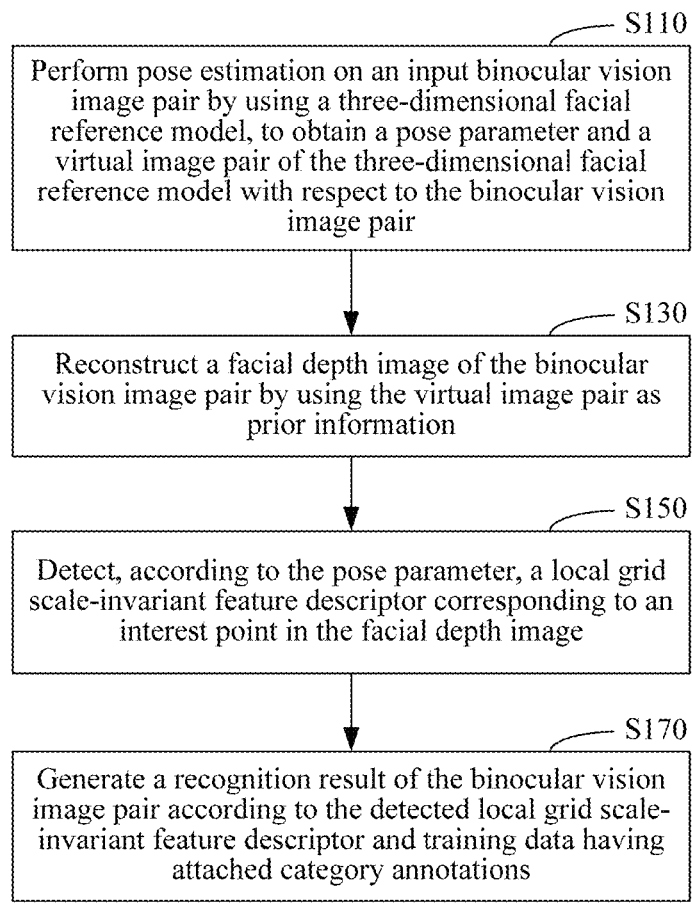
FIG. 1 is a flowchart of a three-dimensional facial recognition method in an embodiment.

As shown in FIG. 1, in an embodiment, a three-dimensional facial recognition method includes the following steps. The disclosed three-dimensional facial recognition method may be implemented by a computing device.

Step 110: Performing pose estimation on an input binocular vision image pair by using a three-dimensional facial reference model, to obtain a pose parameter and a virtual image pair of the three-dimensional facial reference model with respect to the binocular vision image pair.

In this embodiment, the three-dimensional facial reference model is a binocular facial picture that is taken in advance by a calibrated camera, where the binocular facial picture taken in advance includes a left-side facial picture and a right-side facial picture, and coordinates of interest points (i.e., feature points) in the left-side facial picture and right-side facial picture are also determined in advance. The camera may be a stereo camera having at least two lenses for capturing a binocular vision image pair from two slightly horizontally separated points. Alternatively, the camera may refer to two individual cameras configured at two slightly horizontally separated points for capturing a binocular vision image pair.

The input binocular vision image pair is a pair of vision images of a user captured and calibrated when identification verification using three-dimensional face recognition is performed on the user, and is used to ensure accuracy of subsequent processing. Specifically, the binocular vision image pair includes a left-side vision image and a right-side vision image, which satisfy an epipolar constraint, that is, points on a horizontal line in the left-side vision image are also on a same horizontal line in the right-side vision image. In other words, two matching pixels in the left-side vision image and the right-side vision image may have a same vertical coordinate and may have disparity between their horizontal coordinates.

Under the effect of the three-dimensional facial reference model, pose estimation is performed on the binocular vision image pair to obtain a facial pose in the binocular vision image pair and the virtual image pair, where the facial pose is represented by the pose parameter, and indicates an angle of rotation in three-dimensional space by the face in the binocular vision image, and a position in a two-dimensional plane to which the face is mapped. The virtual image pair is a pair of images that include a face corresponding to the three-dimensional facial reference model, where the face has a same face pose and size as that in the binocular vision image pair.

Step 130: Reconstructing a facial depth image of the binocular vision image pair by using the virtual image pair as prior information.

In this embodiment, the facial depth image is an image that corresponds to the face in the binocular vision image pair and includes depth information. Because the virtual image pair corresponds to the three-dimensional facial reference model, and information such as coordinates of interest points in the virtual image pair can all be obtained according to the three-dimensional facial reference model, the facial depth image of the binocular vision image pair is reconstructed by using the virtual image pair as prior information.

Step 150: Detecting, according to the pose parameter, a local grid scale-invariant feature descriptor (i.e., local mesh scale-invariant feature transform descriptor, LMSIFT descriptor) corresponding to an interest point in the facial depth image.

In this embodiment, the interest point refers to a key point for face recognition, for example, the interest point may be a point on the nose, a point on the left eye, or a point on the right eye; the interest point is accurately described by using a local grid scale-invariant feature descriptor (SIFT feature) that effectively reflects the invariance of scale and rotation in a three-dimensional facial shape, thereby ensuring the consistency of the interest point, and further improving the accuracy and robustness of description of the three-dimensional facial shape.

Specifically, interest points in the facial depth image are detected, to obtain a plurality of interest points that can accurately represent the three-dimensional facial shape, and further, local grid scale-invariant feature descriptors are calculated, to obtain a local grid scale-invariant feature descriptor corresponding to each interest point.

Step 170: Generating a recognition result of the binocular vision image pair according to the detected local grid scale-invariant feature descriptor and training data having attached category annotations.

In this embodiment, the training data includes samples of a plurality of users and a category annotation attached to each sample, and the category annotation identifies a category of the user. For example, the sample and category annotation corresponding to each user provide credentials for completing identification authentication next time.

After the local grid scale-invariant feature descriptor corresponding to the interest point in the binocular vision image pair input by the user is detected, the binocular vision image pair input by the user is compared with samples in the training data according to the local grid scale-invariant feature descriptor and the training data, to learn whether the user passes identification verification (e.g., whether a match is found in the training sample), thereby obtaining a corresponding recognition result.

The local grid scale-invariant feature descriptor is introduced in the foregoing manner to describe the input binocular vision image pair, and moreover, due to the invariance of the scale and rotation of the local grid scale-invariant feature descriptor, the description of the input binocular vision image pair is more accurate and has better robustness and consistency, thereby ensuring the robustness and consistency during the three-dimensional face recognition.

Figure 2:
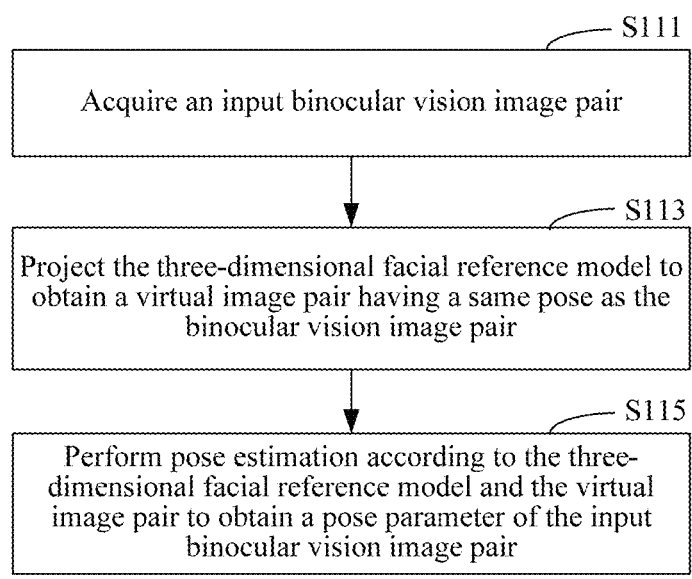
FIG. 2 is a flowchart of a method of performing pose estimation on an input binocular vision image pair by using a three-dimensional facial reference model, to obtain a pose parameter and a virtual image pair of the three-dimensional facial reference model with respect to the binocular vision image pair in FIG. 1.

As shown in FIG. 2, in an embodiment, step 110 includes the following steps.

Step 111: Acquiring an input binocular vision image pair.

In this embodiment, a binocular vision image pair is taken by a calibrated camera, and the taken binocular vision image pair is calibrated, so that corresponding points in the left-side vision image and right-side vision image of the binocular vision image pair are on a same horizontal line; after calibration on the binocular vision image pair, the calibrated binocular vision image pair is used as a binocular vision image pair input in three-dimensional face recognition.

Step 113: Projecting the three-dimensional facial reference model to obtain a virtual image pair having a same pose as the binocular vision image pair.

Figure 3:
FIG. 3 is a left-side vision image in a binocular vision image pair in an embodiment.
Figure 4:
FIG. 4 is a right-side vision image in a binocular vision image pair in an embodiment.
Figure 5:
FIG. 5 is a left-side virtual image corresponding to the left-side vision image in FIG. 3.
Figure 6:
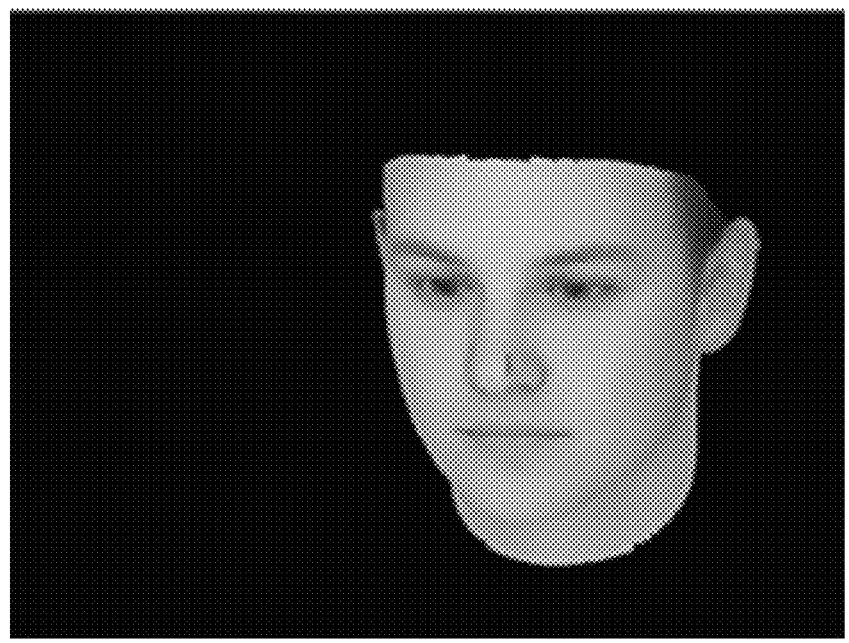
FIG. 6 is a right-side virtual image corresponding to the right-side vision image in FIG. 4.

In this embodiment, orthogonal projection is performed on the three-dimensional facial reference model by using the input binocular vision image pair as a reference, to obtain the virtual image pair, where a facial shape in the virtual image pair is the same as a three-dimensional facial shape in the three-dimensional facial reference model. However, the pose of the facial shape in the virtual image pair is the same as the pose of the face in the input binocular vision image pair. The input binocular vision image pair is as shown in FIG. 3 and FIG. 4, where FIG. 3 shows a left-side vision image, and FIG. 4 shows a right-side vision image; correspondingly, the virtual image pair corresponding to the input binocular vision image pair is as shown in FIG. 5 and FIG. 6, where FIG. 5 shows a left-side virtual image, and FIG. 6 shows a right-side virtual image.

Step 115: Performing pose estimation according to the three-dimensional facial reference model and the virtual image pair to obtain a pose parameter of the input binocular vision image pair.

In this embodiment, the pose parameter of the input binocular vision image pair is an angle of rotation in three-dimensional space by the face in the binocular vision image pair, and the rotation angle may be represented by $\gamma$, $\theta$, and $\varphi$, where $\gamma$, $\theta$, and $\varphi$ are rotation angles around the X-axis, Y-axis, and Z-axis in the three-dimensional space, respectively.

Specifically, the pose parameter of the face in the binocular vision image pair satisfies the following relationship with three-dimensional space coordinates of the interest point in the three-dimensional facial reference model and two-dimensional mapping points of the coordinates of the interest point:

$$p = f \begin{pmatrix} 1 & 0 & 0 \\ 0 & 1 & 0 \end{pmatrix} R_\gamma R_\theta R_\varphi x + t_{2d} \qquad (1)$$

where $x=(x, y, z)^T$ represents the three-dimensional space coordinates of the interest point in the three-dimensional facial reference model; $p=(px, py)^T$ represents a two-dimensional mapping point (i.e., 2D projection point) of the coordinates of the interest point; $R=R_\gamma R_\theta R_\varphi$ represents a rotation matrix; $\gamma$, $\theta$, and $\varphi$ are rotation angles around the X-axis, Y-axis, and Z-axis in the three-dimensional space, respectively, the X-axis, Y-axis, and Z-axis in the three-dimensional space being related to the pose corresponding to the three-dimensional facial shape in the three-dimensional facial reference model; $t_{2d}$ is displacement in a two-dimensional plane; and f is a focal length related to a three-dimensional facial length.

The pose parameters are estimated according to the Levenberg Marquardt algorithm, so as to estimate an optimal solution of the parameters $\{\gamma, \theta, \varphi, f, px, py\}$ and to obtain the pose parameter of the input binocular vision image pair, where an optimal function is shown in the following formula:

$$\min \sum_{j=1,\ldots,N} (F_{x,j} - p_{x,j})^2 - (F_{y,j} - p_{y,j})^2 \qquad (2)$$

where $(F_{x,j}, F_{y,j})$ is the position of a two-dimensional mapping point corresponding to the coordinates of the interest point, and $(p_{x,j}, p_{y,j})$ is the position of the three-dimensional interest point matching the two-dimensional point. With pose parameters computed by pose estimation, the virtual image pair of the 3D facial reference model (e.g., as show in FIGS. 5-6) can be obtained with the same size and pose as the binocular vision image pair (e.g., as shown in FIGS. 3-4).

Figure 7:
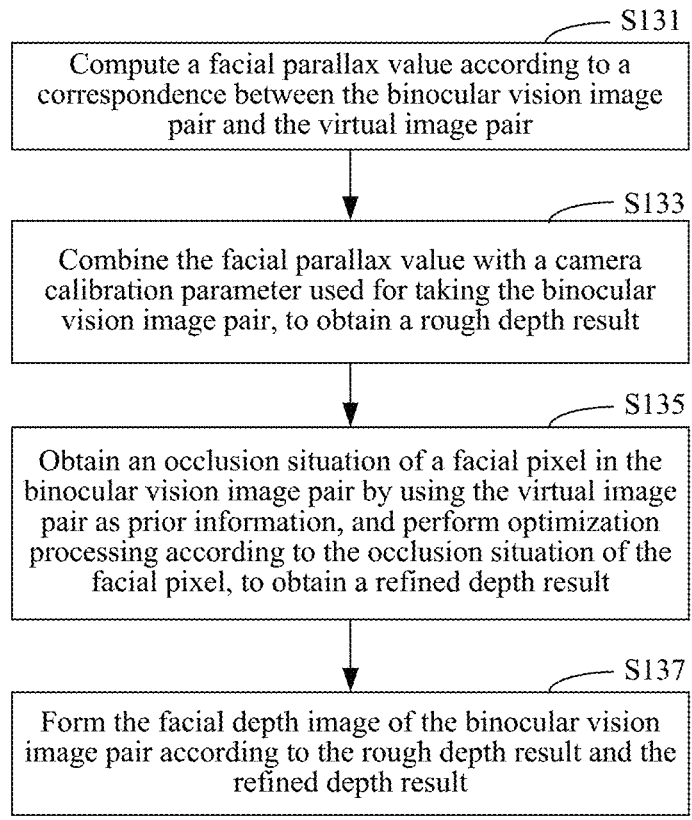
FIG. 7 is a flowchart of a method of reconstructing a facial depth image of the binocular vision image pair by using the virtual image pair as prior information in FIG. 1.

As shown in FIG. 7, in an embodiment, step 130 includes the following steps.

Step 131: Computing facial parallax values according to correspondences between the binocular vision image pair and the virtual image pair.

In this embodiment, because the virtual image pair is generated from the three-dimensional facial reference model, and a correspondence between the left-side virtual image and right-side virtual image of the virtual image pair is known, the virtual image pair is used as prior knowledge for identifying positions of matching points in the binocular vision image pair. The left and right input binocular vision images may respectively register with the left and right virtual images.

Specifically, matching points in the binocular vision image pair may be identified by using the following process.

(1) Obtaining, according to the correspondence between the left-side vision image and the left-side virtual image, a corresponding point on the left-side virtual image for a point on the left-side vision image.

(2) Obtaining, according to the correspondence between the left-side virtual image and right-side virtual image in the virtual image pair, a corresponding point on the right-side virtual image for a point on the left-side virtual image.

(3) Obtaining, according to the correspondence between the right-side vision image and the right-side virtual image, a corresponding point on the right-side virtual image for a point on the right-side vision image.

On the basis that points on the right-side vision image and left-side vision image satisfy the epipolar constraint, the corresponding point on the right-side virtual image for the point on the right-side vision image and the corresponding point on the left-side virtual image for the point on the left-side vision image are two stereo-matching corresponding points.

A horizontal difference between the matching corresponding points is the facial parallax value. In other words, horizontal coordinates of two stereo-matching corresponding points are acquired, and a difference between the two horizontal coordinates is the facial parallax value.

It should be noted that, matching points in the binocular vision image pair may also be determined in the following manner: using the correspondence between the right-side vision image and the right-side virtual image first, and then using the correspondence between the right-side virtual image and the left-side virtual image, and the correspondence between the left-side virtual image and the left-side vision image, to obtain two stereo-matching corresponding points between the left-side vision image and the right-side vision image.

Therefore, the sequence of identifying matching points in the binocular vision image pair may be changed flexibly, and is not limited to the listed sequence.

Step 133: Combining the facial parallax values with a camera calibration parameter used for taking the binocular vision image pair, to obtain a rough depth result.

In this embodiment, the rough depth result is a rough parallax result. The camera calibration parameter is obtained by parameter calibration performed by the camera. Specifically, a template is printed and adhered to a plane, a plurality of template images is taken from different angles, and interest points in the template images are detected, so as to solve an intrinsic parameter, an extrinsic parameter, and a distortion parameter of the camera, where the intrinsic parameter, the extrinsic parameter, and the distortion parameter of the camera are the calibration parameter of the camera.

Step 135: Obtaining an occlusion situation (i.e., occlusion information) of facial pixels in the binocular vision image pair by using the virtual image pair as prior information, and perform optimization processing according to the occlusion information of the facial pixels, to obtain a refined depth result.

In this embodiment, with reference to the virtual image pair that serves as facial prior information, namely, the correspondence between the left-side vision image and left-side virtual image in the binocular vision image, the correspondence between the left-side virtual image and the right-side virtual image, and the correspondence between the right-side virtual image and the right-side vision image, an occlusion information of a facial pixel in the binocular vision image pair is obtained.

Specifically, it is obtained, according to the facial prior information, whether facial pixel x in the binocular vision image pair is occluded in the left-side vision image; if facial pixel x is occluded, the occlusion information corresponding to facial pixel in the left-side vision image x is $O_L(x)=1$, or if facial pixel x is not occluded, $O_L(x)=0$; $O_R$ for pixels in the right-side vision image is defined in a similar manner.

Further optimization processing is performed on a key facial region according to occlusion information of facial pixels in the binocular vision image pair, to obtain a refined depth result.

The key facial region is a key region for facial recognition, for example, the key facial region may be a nose region of the face in the binocular vision image pair.

Further, a facial depth map D (i.e., image disparity map) may be calculated according to the following formula:

$$\min E, s.t. E(D,O;I) = E_d(D,O;I) + E_s(D,O;I) + E_v(D,O;I) \quad (3)$$

where $E_d(D,O;I)$ is data term in the binocular vision image, $E_s(D,O;I)$ is a smoothing term, and $E_v(D,O;I)$ describes a visibility feature of three-dimensional data.

The data term is defined as $$E_d(D, O; I) = \sum_x \left( E_{d_1}(D, O; I) \cdot P_F^f(x) + E_{d_2}(D, O; I) \cdot P_B^f(x) \right) \quad (4)$$

where $E_{d_1}(D,O;I)$ is an energy function of a foreground region, $E_{d_2}(D,O;I)$ is used for providing a background region, and $P_F^f(x)$ and $P_B^f(x)$ separately represent a probability of facial pixel x in the foreground region and the background region. Further, $$P_F^f(x) = \begin{cases} S(x), & \text{if } Dis(x) > T_b \\ P_F(x)/(P_F(x) + P_B(x)), & \text{otherwise} \end{cases} \quad (5)$$

where $P_F(x)$ is a foreground probability, $P_B(x)$ is a background probability, S is a foreground regional map, Dis(x) is a Euclidean distance from a facial pixel x to a segmentation edge, and Tb is a preset threshold.

$P_B^f(x)$ is calculated according to the following formula:

$$P_B^f(x) = 1 - P_F^f(x) \quad (6)$$

Therefore, $E_d(D,O;I)$ may be further expressed as follows:

$$E_d(D, O; I) = \sum_x \frac{1}{Z_n(x)} \begin{pmatrix} O_L(x)O_R(x)\eta + \\ (1 - O_L(X))(1 + O_R(x))\rho(x, D(x); I_L) + \\ (1 - O_R(x))(1 + O_L(x))\rho(x, D(x); I_R) \end{pmatrix} \quad (7)$$

where $I_L$ is the left-side vision image, $I_R$ is the right-side vision image, $\rho(x, D(x); I)$ describes the robustness of the matching cost between a facial pixel x and its corresponding disparity (i.e., parallax value) d, $Z_n(x)$ is a normalized parameter of the matching cost of each facial pixel x, and the cost $\eta$ is used for quantizing a ratio of occlusion to the entire image.

The smoothing term is defined as $$E_s(D, O; I) = \sum_x \sum_{y \in N(x)} \lambda(x, y)\rho_s(D(x), D(y)) \quad (8)$$

so as to effectively reflect local smoothness in the reconstructed facial depth image. N(x) is a set of neighboring pixels of facial pixel x, λ(x, y) is a discontinuity factor consistent with a mutation (e.g., abrupt variation), ρ is defined as a robustness formula of $\rho_s(D(x),D(y))=\min(|D(x)-D(y)|,T)$, and T is used for controlling a cost ceiling (i.e., upper cost limit).

After the facial depth map D is calculated, the reconstructed refined depth result Z is obtained by using the camera calibration parameter, that is:

$$Z = \frac{F \cdot b}{D} \quad (9)$$

where F is a focal length of the camera, and b is a baseline distance of the camera.

Excellent performance of three-dimensional face reconstruction is obtained with reference to the prior information, and the three-dimensional face reconstruction can be accurately implemented even in a case with a poor lighting condition and occlusion; the stability and speed of the three-dimensional face recognition are improved.

Step 137: Forming the facial depth image of the binocular vision image pair according to the rough depth result and the refined depth result.

Figure 8:
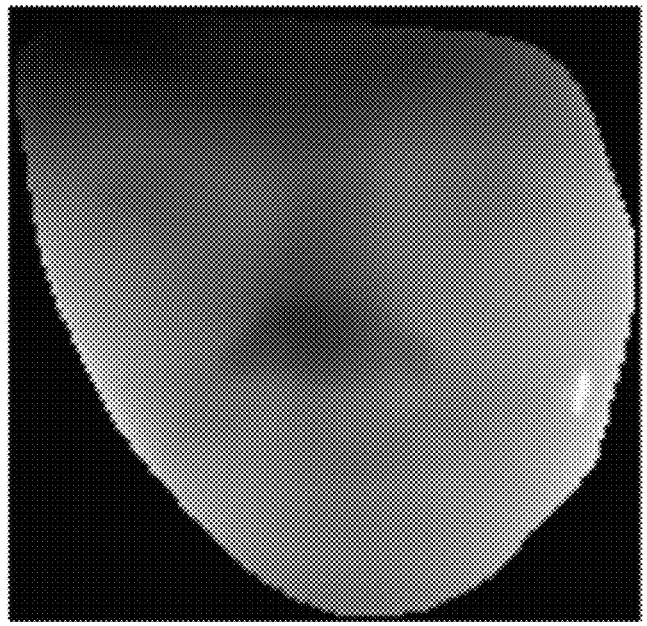
FIG. 8 is a schematic diagram of a facial depth image in an embodiment.

In this embodiment, a facial depth image in which a refined key facial region is extracted from the occlusion and a complex background, for example, the facial depth image shown in FIG. 8, is obtained according to the rough depth result and refined depth result.

Through the foregoing reconstruction of the facial depth image, the three-dimensional face is reproduced in a stereo manner, which provides a basis for authentic reflection of a geometric result of the input face.

In another embodiment, before step 150, the method further includes: performing facial segmentation on the facial depth image according to shape index values and shape band, to obtain a plurality of facial regions.

In this embodiment, the shape index value and the shape band are both shape parameters for representing a facial shape, where the shape index value is calculated according to a three-dimensional surface curvature, and the facial segmentation is performed by using the shape index value and the shape band.

Specifically, the shape index values and shape band are used as salient shape features for segmentation to obtain different facial regions. For example, a shape band of an eye region is used as a search window, a position having a Gaussian curvature close to zero is determined as an eye socket position. Further, rightmost points and leftmost points along the shape band may be searched, so as to extract a nose border shaped like a saddle rut. A region above the eye is regarded as a forehead and blank region, a region from a left eye region to the mouth is regarded as a left cheek region, and a region from a right eye region to the mouth is regarded as a right cheek region, as shown in FIG. 9.

As shown in FIG. 10, in an embodiment, step 150 includes the following steps.

Step 151: Performing calculation on the plurality of facial regions obtained during the facial segmentation, to obtain three-dimensional facial grids (i.e., mesh data) included in each of the facial regions.

In this embodiment, calculation is performed by using the Delaunay algorithm (Delaunay triangulation algorithm) on the plurality of facial regions obtained during the facial segmentation, to obtain three-dimensional facial grids included in each facial region.

Step 153: Detecting interest points in the three-dimensional facial grids.

In this embodiment, a Gaussian filter with an invariant density is used to calculate surface geometric shapes of the three-dimensional facial grids, so as to obtain interest points in the three-dimensional facial grids.

Specifically, interest points are detected by using 8*8 three-dimensional facial grids as a set.

A difference of Gaussian scale-space, namely, a DOG function, is constructed by using consecutive sets of 8*8 three-dimensional facial grids, where a vertex thereof is $V_i^S$, and a vertex of a next set of 8*8 three-dimensional facial grids is $V_i^{S+1}$, that is:

$$V_i^{S+1} = \frac{1}{Vn_i^S} \sum_{v_j^S \in Vn_i^S} v_j^S \quad (10)$$

where $Vn_i^S$ represents that the first order neighbors of $V_i^S$, and is invariant to the distance between the vertices and reflect facial structural information.

The DoG function $d_i^S$ is calculated according to the following formula:

$$d_i^S = \frac{1}{\sigma_S^2} |v_i^S - v_i^{S+1}| \quad (11)$$

where $\sigma_S$ is a scale factor (width of the filter), and is calculated according to $$\sigma_S = \sqrt{N} D_i, \text{ and } D_i = \frac{1}{Vn_i^S} \sum_{v_j^S \in Vn_j^S} |v_i^S - v_j^S|.$$

In this case, an obtained point at the local maxima both in scale and location at scales, namely, a point with a maximum $d_i^S$ value, is the interest point.

Step 155: Calculating, according to the pose parameter of the binocular vision image pair, local grid scale-invariant feature descriptors corresponding to the detected interest points.

Figure 11:
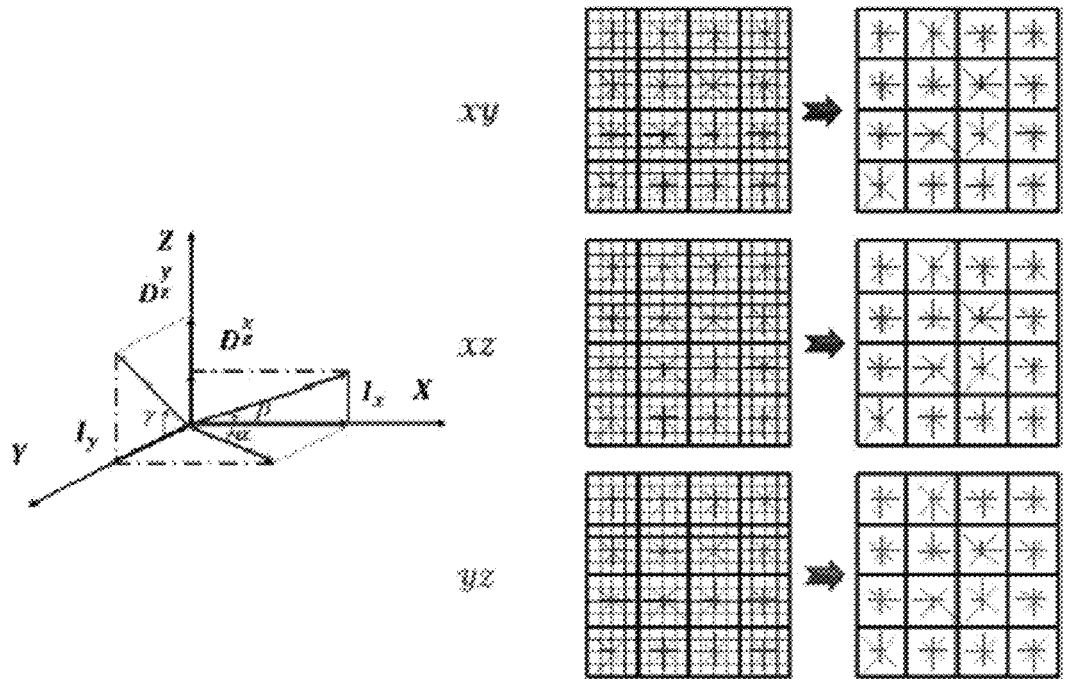
FIG. 11 is a schematic diagram of an application of a local grid scale-invariant feature descriptor that is corresponding to an interest point and calculated in an embodiment.

In this embodiment, the local grid scale-invariant feature descriptor is calculated according to a gradient histogram of each interest point. Projection points in the x-y plane, y-z plane, and x-z plane are set for each detected interest point, and a corresponding local grid scale-invariant feature descriptor is calculated according to three-dimensional gradient space and the pose parameter of the binocular vision image pair, as shown in FIG. 11, where $I_x$ is an x-axis coordinate corresponding to an x-y plane projection point or x-z plane projection point of an interest point, $I_y$ is a y-axis coordinate corresponding to the x-y plane projection point or a y-z plane projection point of the interest point, $D_z^y$ is a y-axis coordinate corresponding to the y-z plane projection point of the interest point, $D_z^x$ is a y-axis coordinate corresponding to the x-z plane projection point of the interest point, and parameters γ, α, and β are obtained according to the pose parameter.

Therefore, image gradients in the horizontal direction and the vertical direction can be calculated according to the following formula:

$$I_x = \nabla_x(I) = \frac{\partial I}{\partial x}, I_y = \nabla_y(I) = \frac{\partial I}{\partial y} \qquad (12)$$

$$D_x = \nabla_x(D) = \frac{\partial D}{\partial x}, D_y = \nabla_y(D) = \frac{\partial D}{\partial y}$$

where $\frac{\partial(\cdot)}{\partial x}$ and $\frac{\partial(\cdot)}{\partial y}$ are a gradient in the x direction and a gradient in the y direction, respectively, and further, the calculated image gradients serve as the local grid scale-invariant feature descriptor.

As shown in FIG. 11, in each three-dimensional facial grid, an arrow direction represents a gradient direction of a facial pixel in the three-dimensional facial grid, and an arrow length represents a gradient modulus value. In 8*8 three-dimensional facial grids, 4*4 three-dimensional facial grids are used to calculate accumulated values in eight gradient directions, to draw a histogram in each direction, thereby forming a seed point, where one interest point is formed by a total of four (2*2) seed points, each seed point is a set of 8-dimensional vectors, and 8-dimensional vectors corresponding to the four seed points form the local grid scale-invariant feature descriptor of the interest point; due to its characteristic of gradient direction distribution, the local grid scale-invariant feature descriptor of the interest point is invariant to rotation.

The calculated local grid scale-invariant feature descriptor can effectively handle the massing data degradation caused by extreme poses, occlusion and illumination, thereby ensuring the accuracy.

Figure 12:
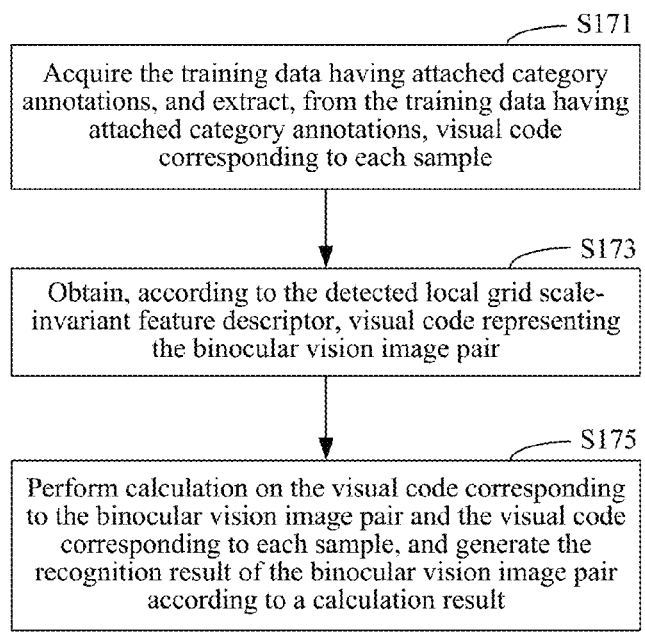
FIG. 12 is a flowchart of a method of generating a recognition result of the binocular vision image pair according to the detected local grid scale-invariant feature descriptor and training data having attached category annotations in an embodiment.

As shown in FIG. 12, in an embodiment, step 170 includes the following steps.

Step 171: Acquiring the training data having attached category annotations, and extracting, from the training data having attached category annotations, visual code corresponding to each sample.

In this embodiment, the training data includes samples of a plurality of users and a category annotation attached to each sample, where a local grid scale-invariant feature descriptor is used to describe a sample, and the local grid scale-invariant feature descriptor is quantized to obtain visual code corresponding to the sample; therefore, each sample has corresponding visual code, and by using the visual code corresponding to the samples, the plurality of samples is compared with a currently input binocular vision image pair.

Step 173: Obtaining, according to the detected local grid scale-invariant feature descriptor, visual code representing the binocular vision image pair.

In this embodiment, the local grid scale-invariant feature descriptor corresponding to the interest point detected in the binocular vision image pair is quantized, to obtain corresponding visual code.

Step 175: Performing calculation on the visual code corresponding to the binocular vision image pair and the visual code corresponding to each sample, and generating the recognition result of the binocular vision image pair according to a calculation result.

In this embodiment, a similarity between the visual code of the binocular vision image pair and the visual code corresponding to each sample is calculated, to obtain a sample most similar to the binocular vision image pair, and the recognition result is generated according to the category annotation corresponding to this sample.

Figure 13:
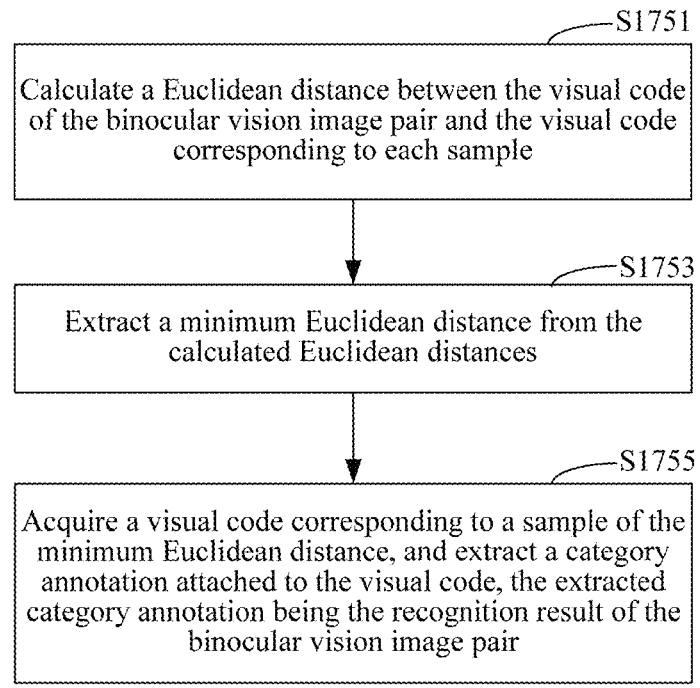
FIG. 13 is a flowchart of a method of performing calculation on the visual code corresponding to the binocular vision image pair and the visual code corresponding to each sample, and generating the recognition result of the binocular vision image pair according to a calculation result in FIG. 12.

As shown in FIG. 13, in an embodiment, step 175 includes the following.

Step 1751: Calculating a Euclidean distance between the visual code of the binocular vision image pair and the visual code corresponding to each sample.

In this embodiment, because the visual code of the binocular vision image pair and the visual code corresponding to each sample are both values of quantized local grid scale-invariant feature descriptors, the Euclidean distance between the visual code of the binocular vision image pair and the visual code corresponding to each sample is calculated on the basis of the visual code of the binocular vision image pair and the visual code corresponding to each sample.

Step 1753: Extracting a minimum Euclidean distance from the calculated Euclidean distances.

In this embodiment, a plurality of Euclidean distances is calculated, where the Euclidean distance represents the similarity between the binocular vision image pair and the sample, that is, a greater Euclidean distance indicates a lower similarity between the binocular vision image pair and the sample, and a smaller Euclidean distance indicates a higher similarity between the binocular vision image pair and the sample.

Based on this, a smallest Euclidean distance is extracted from the plurality of calculated Euclidean distances.

Step 1755: Acquiring visual code corresponding to a sample having the minimum Euclidean distance, and extract a category annotation attached to the visual code, the extracted category annotation being the recognition result of the binocular vision image pair.

In another embodiment, before step 170, the method further includes: constructing, by using the local grid scale-invariant feature descriptor, a category annotation and visual code that use a binocular vision image pair of a new user as a sample.

In this embodiment, when a new user is added, a sample corresponding to the new user needs to be added to the training data and a category annotation needs to be attached to the sample.

Specifically, after the interest point in the binocular vision image pair and the local grid scale-invariant feature descriptor corresponding to the interest point are detected through step 110 to step 150, the local grid scale-invariant feature descriptor is quantized, so as to obtain a sample of a new user, a category annotation attached to the sample, and visual code.

Figure 14:
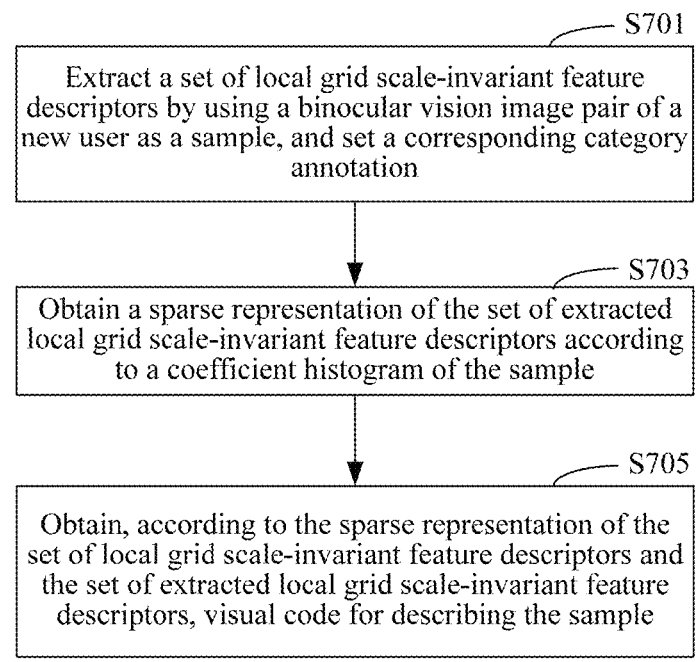
FIG. 14 is a flowchart of a method of constructing, by using the local grid scale-invariant feature descriptor, a category annotation and visual code that use a binocular vision image pair of a new user as a sample in an embodiment.

As shown in FIG. 14, in an embodiment, the foregoing step of constructing, by using the local grid scale-invariant feature descriptor, a category annotation and visual code that use a binocular vision image pair of a new user as a sample includes the following steps.

Step 701: Extracting a set of local grid scale-invariant feature descriptors by using a binocular vision image pair of a new user as a sample, and set a corresponding category annotation.

In this embodiment, N D-dimensional local features, namely, local grid scale-invariant feature descriptors of D dimensions, are extracted from the binocular vision image pair of the new user, and are denoted by $L=[l_1, l_2, \ldots, l_N] \in R^{D \times N}$.

Step 703: Obtaining a sparse representation of the set of extracted local grid scale-invariant feature descriptors according to a coefficient histogram of the sample.

In this embodiment, the sparse representation of the set of extracted local grid scale-invariant feature descriptors is calculated according to the coefficient histogram of the sample; specifically, it is defined that $C=[c_1, c_2, \ldots, c_N] \in R^M$ is the sparse representation of L, and the corresponding sparse representation is obtained by solving the following optimization problem:

$$\min_{C} // L - BC //_F^2, \quad (13)$$

$$\text{s.t. } // c_i // \leq k, \forall i$$

where B is a constructed visual vocabulary book, it is defined that $B=[b_1, b_2, \ldots, b_M] \in R^{D \times M}$, and B is a set of over-complete bases in the D-dimensional space, $//\bullet//_F$ is the Frobenius norm, $//\bullet//_0$ is a $l_0$ norm obtained by counting non-zero elements, and a sparse coefficient of a vector $c_i \in C$ is related to a specified category.

Therefore, the coefficient histogram is used to perform calculation on the sample of each user, that is, the sparse representation of the local grid scale-invariant feature descriptors is calculated according to $$h_j = \frac{1}{N} \sum_{i=1}^{N} c_i.$$

$c_i \in R^M$ is the $i^{th}$ local grid scale-invariant feature descriptor of $C \in R^{M \times N}$, N is the total number of local grid scale-invariant feature descriptors in a sample, and $h_j \in R^M$.

Step 705: Obtaining, according to the sparse representation of the set of local grid scale-invariant feature descriptors and the set of extracted local grid scale-invariant feature descriptors, visual code for describing the sample.

In this embodiment, after the sparse representation of the set of extracted local grid scale-invariant feature descriptors is calculated, the foregoing optimization problem, namely, formula (13), is solved, to obtain a corresponding visual vocabulary book, and further obtain visual code corresponding to the sample of the new user.

The sparse representation of local grid scale-invariant feature descriptors represents, by using a sparse constraint method, a mapping from the local grid scale-invariant feature descriptors to a feature space of the visual vocabulary book, so as to represent features effectively.

Further, in the visual vocabulary book, each sample is encoded by using a coefficient histogram to obtain corresponding visual code, so as to facilitate a subsequent facial recognition process.

The foregoing three-dimensional facial recognition method is implemented by learning local grid scale-invariant feature descriptors to construct a visual vocabulary book for virtual sparse representation, and therefore, can effectively avoid impact from self-occlusion, has an extremely high recognition speed, is less complex, and is easier to implement.

With the local grid scale-invariant feature descriptors, each facial shape feature can be captured, and three-dimensional geometrical information can be drawn in a valid facial region, namely, a key facial region, thereby achieving desirable robustness and consistency in identity recognition.

Figure 15:
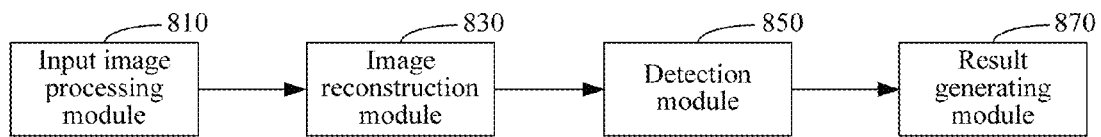
FIG. 15 is a schematic structural diagram of a three-dimensional facial recognition system in an embodiment.

As shown in FIG. 15, in an embodiment, a three-dimensional facial recognition system includes an input image processing module 810, an image reconstruction module 830, a detection module 850, and a result generating module 870.

The input image processing module 810 is configured to perform pose estimation on an input binocular vision image pair by using a three-dimensional facial reference model, to obtain a pose parameter and a virtual image pair of the three-dimensional facial reference model with respect to the binocular vision image pair.

In this embodiment, the three-dimensional facial reference model is a binocular facial picture that is taken in advance by a calibrated camera, where the binocular facial picture taken in advance includes a left-side facial picture and a right-side facial picture, and coordinates of interest points in the left-side facial picture and right-side facial picture are also determined in advance.

The input binocular vision image pair is a pair of vision images of a user captured and calibrated when identification verification using three-dimensional face recognition is performed on the user, and is used to ensure accuracy of subsequent processing. Specifically, the binocular vision image pair includes a left-side vision image and a right-side vision image, which satisfy an epipolar constraint, that is, points on a same horizontal line in the left-side vision image are also on a same horizontal line in the right-side vision image.

Under the effect of the three-dimensional facial reference model, the input image processing module 810 performs pose estimation on the binocular vision image pair to obtain a facial pose in the binocular vision image pair and the virtual image pair, where the facial pose is represented by the pose parameter, and indicates an angle of rotation in three-dimensional space by the face in the binocular vision image, and a position in a two-dimensional plane to which the face is mapped. The virtual image pair is a pair of images that include a face corresponding to the three-dimensional facial reference model, where the face has a same face pose and size as that in the binocular vision image pair.

The image reconstruction module 830 is configured to reconstruct a facial depth image of the binocular vision image pair by using the virtual image pair as prior information.

In this embodiment, the facial depth image is an image that corresponds to the face in the binocular vision image pair and includes depth information. Because the virtual image pair corresponds to the three-dimensional facial reference model, and information such as coordinates of interest points in the virtual image pair can all be obtained according to the three-dimensional facial reference model, the image reconstruction module 830 reconstructs the facial depth image of the binocular vision image pair by using the virtual image pair as prior information.

The detection module 850 is configured to detect, according to the pose parameter, a local grid scale-invariant feature descriptor corresponding to an interest point in the facial depth image.

In this embodiment, the interest point refers to a key point for face recognition, for example, the interest point may be a point on the nose, a point on the left eye, or a point on the right eye; the interest point is accurately described by using a local grid scale-invariant feature descriptor that effectively reflects the invariance of scale and rotation in a three-dimensional facial shape, thereby ensuring the consistency of the interest point, and further improving the accuracy and robustness of description of the three-dimensional facial shape.

Specifically, the detection module 850 detects interest points in the facial depth image, to obtain a plurality of interest points that can accurately represent the three-dimensional facial shape, and further calculate local grid scale-invariant feature descriptors, to obtain a local grid scale-invariant feature descriptor corresponding to each interest point.

The result generating module 870 is configured to generate a recognition result of the binocular vision image pair according to the detected local grid scale-invariant feature descriptor and training data having attached category annotations.

In this embodiment, the training data includes samples of a plurality of users and a category annotation attached to each sample, and the category annotation identifies a category of the user. For example, the sample and category annotation corresponding to each user provide credentials for completing identification authentication next time.

After the local grid scale-invariant feature descriptor corresponding to the interest point in the binocular vision image pair input by the user is detected, the result generating module 870 compares the binocular vision image pair input by the user with samples in the training data according to the local grid scale-invariant feature descriptor and the training data, to learn whether the user passes identification verification, thereby obtaining a corresponding recognition result.

The local grid scale-invariant feature descriptor is introduced in the foregoing manner to describe the input binocular vision image pair, and moreover, due to the invariance of the scale and rotation of the local grid scale-invariant feature descriptor, the description of the input binocular vision image pair is more accurate and has better robustness and consistency, thereby ensuring the robustness and consistency during the three-dimensional face recognition.

Figure 16:
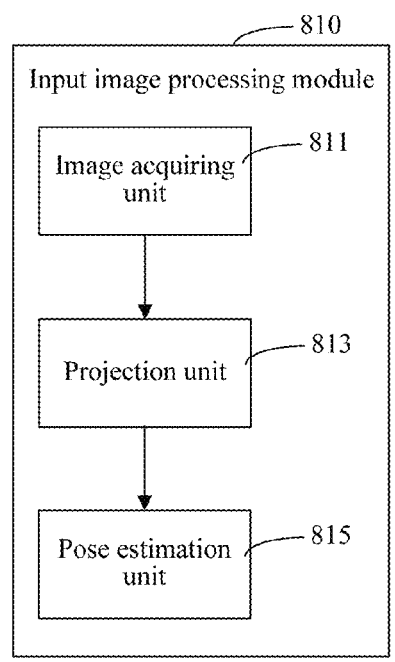
FIG. 16 is a schematic structural diagram of an input image processing module in FIG. 15.

As shown in FIG. 16, in an embodiment, the input image processing module 810 includes an image acquiring unit 811, a projection unit 813, and a pose estimation unit 815.

The image acquiring unit 811 is configured to acquire an input binocular vision image pair.

In this embodiment, a binocular vision image pair is taken by a calibrated camera, and the taken binocular vision image pair is calibrated, so that corresponding points in the left-side vision image and right-side vision image of the binocular vision image pair are on a same horizontal line; after calibration on the binocular vision image pair, the image acquiring unit 811 uses the calibrated binocular vision image pair as a binocular vision image pair input in three-dimensional face recognition.

The projection unit 813 is configured to project the three-dimensional facial reference model to obtain a virtual image pair having a same pose as the binocular vision image pair.

In this embodiment, the projection unit 813 performs orthogonal projection on the three-dimensional facial reference model by using the input binocular vision image pair as a reference, to obtain the virtual image pair, where a facial shape in the virtual image pair is the same as a three-dimensional facial shape in the three-dimensional facial reference model. However, the pose of the facial shape in the virtual image pair is the same as the pose of the face in the input binocular vision image pair.

The pose estimation unit 815 is configured to perform pose estimation according to the three-dimensional facial reference model and the virtual image pair to obtain a pose parameter of the input binocular vision image pair.

In this embodiment, the pose parameter of the input binocular vision image pair is an angle of rotation in three-dimensional space by the face in the binocular vision image pair, and the rotation angle may be represented by γ, θ, and φ, where γ, θ, and φ are rotation angles around the X-axis, Y-axis, and Z-axis in the three-dimensional space, respectively.

Specifically, the pose parameter of the face in the binocular vision image pair satisfies the following relationship with three-dimensional space coordinates of the interest point in the three-dimensional facial reference model and two-dimensional mapping points of the coordinates of the interest point:

$$p = f\begin{pmatrix} 1 & 0 & 0 \\ 0 & 1 & 0 \end{pmatrix} R_\gamma R_\theta R_\phi x + t_{2d} \quad (1)$$

where $x=(x, y, z)^T$ represents the three-dimensional space coordinates of the interest point in the three-dimensional facial reference model; $p=(px, py)^T$ represents a two-dimensional mapping point of the coordinates of the interest point; $R=R_\gamma R_\theta R_\phi$ represents a rotation matrix; γ, θ, and φ are rotation angles around the X-axis, Y-axis, and Z-axis in the three-dimensional space, respectively, the X-axis, Y-axis, and Z-axis in the three-dimensional space being related to the pose corresponding to the three-dimensional facial shape in the three-dimensional facial reference model; $t_{2d}$ is displacement in a two-dimensional plane; and f is a focal length related to a three-dimensional facial length.

The pose estimation unit 815 estimates the pose parameter according to the Levenberg Marquardt algorithm, so as to obtain the pose parameter of the input binocular vision image pair, where an optimal solution function is shown in the following formula:

$$\min \sum_{j=1,\ldots,N} (F_{x,j} - p_{x,j})^2 - (F_{y,j} - p_{y,j})^2 \quad (2)$$

where $(F_{x,j}, F_{y,j})$ the position of a two-dimensional mapping point corresponding to the coordinates of the interest point, and $(p_{x,j}, p_{y,j})$ is the position of the three-dimensional interest point matching the two-dimensional point.

Figure 17:
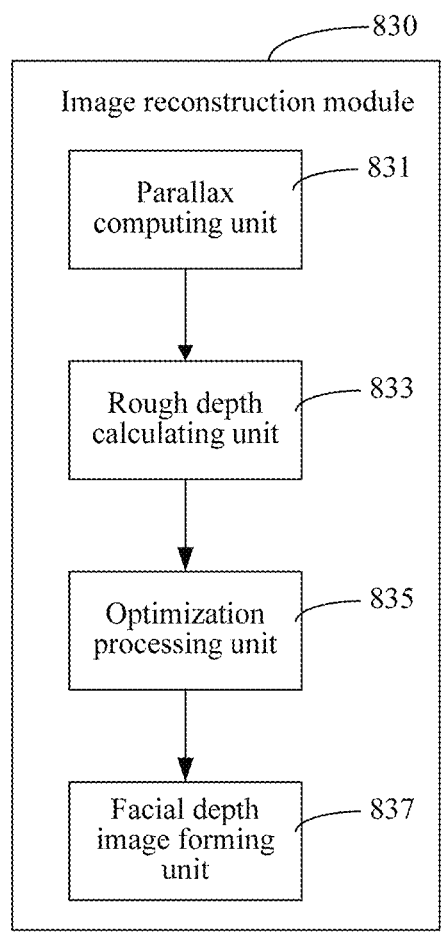
FIG. 17 is a schematic structural diagram of an image reconstruction module in FIG. 15.

As shown in FIG. 17, in an embodiment, the image reconstruction module 830 includes a parallax computing unit 831, a rough depth calculating unit 833, an optimization processing unit 835, and a facial depth image forming unit 837.

The parallax computing unit 831 is configured to compute a facial parallax value according to a correspondence between the binocular vision image pair and the virtual image pair.

In this embodiment, because the virtual image pair is generated from the three-dimensional facial reference model, and a correspondence between the left-side virtual image and right-side virtual image of the virtual image pair is known, the parallax computing unit 831 uses the virtual image pair as prior knowledge for identifying positions of matching points in the binocular vision image pair.

Specifically, the parallax computing unit 831 may identify matching points in the binocular vision image pair by using the following process.

(1) Obtaining, according to the correspondence between the left-side vision image and the left-side virtual image, a corresponding point on the left-side virtual image for a point on the left-side vision image.

(2) Obtaining, according to the correspondence between the left-side virtual image and right-side virtual image in the virtual image pair, a corresponding point on the right-side virtual image for a point on the left-side virtual image.

(3) Obtaining, according to the correspondence between the right-side vision image and the right-side virtual image, a corresponding point on the right-side virtual image for a point on the right-side vision image.

On the basis that points on the right-side vision image and left-side vision image satisfy the epipolar constraint, the corresponding point on the right-side virtual image for the point on the right-side vision image and the corresponding point on the left-side virtual image for the point on the left-side vision image are two stereo-matching corresponding points.

A horizontal difference between the matching corresponding points is the facial parallax value. In other words, the parallax computing unit 831 acquires horizontal coordinates of two stereo-matching corresponding points, and a difference between the two horizontal coordinates is the facial parallax value.

It should be noted that, matching points in the binocular vision image pair may also be determined in the following manner: using the correspondence between the right-side vision image and the right-side virtual image first, and then using the correspondence between the right-side virtual image and the left-side virtual image, and the correspondence between the left-side virtual image and the left-side vision image, to obtain two stereo-matching corresponding points between the left-side vision image and the right-side vision image.

Therefore, the sequence of identifying matching points in the binocular vision image pair may be changed flexibly, and is not limited to the listed sequence.

The rough depth calculating unit 833 is configured to combine the facial parallax value with a camera calibration parameter used for taking the binocular vision image pair, to obtain a rough depth result.

In this embodiment, the rough depth result is a rough parallax result. The camera calibration parameter is obtained by parameter calibration performed by the camera. Specifically, a template is printed and adhered to a plane, a plurality of template images is taken from different angles, and interest points in the template images are detected, so as to solve an intrinsic parameter, an extrinsic parameter, and a distortion parameter of the camera, where the intrinsic parameter, the extrinsic parameter, and the distortion parameter of the camera are the calibration parameter of the camera.

The optimization processing unit 835 is configured to obtain an occlusion information of a facial pixel in the binocular vision image pair by using the virtual image pair as prior information, and perform optimization processing according to the occlusion information of the facial pixel, to obtain a refined depth result.

In this embodiment, with reference to the virtual image pair that serves as facial prior information, namely, the correspondence between the left-side vision image and left-side virtual image in the binocular vision image, the correspondence between the left-side virtual image and the right-side virtual image, and the correspondence between the right-side virtual image and the right-side vision image, the optimization processing unit 835 obtains an occlusion information of a facial pixel in the binocular vision image pair.

Specifically, the optimization processing unit 835 obtains, according to the facial prior information, whether facial pixel x in the binocular vision image pair is occluded in the left-side vision image; if facial pixel x is occluded, the occlusion information corresponding to facial pixel x is $O_L(x)=1$, or if facial pixel x is not occluded, $O_L(x)=0$; $O_R$ is defined in a similar manner.

The optimization processing unit 835 performs further optimization processing on a key facial region according to occlusion information of facial pixels in the binocular vision image pair, to obtain a refined depth result.

The key facial region is a key region for facial recognition, for example, the key facial region may be a nose region of the face in the binocular vision image pair.

Further, a facial depth value D may be calculated according to the following formula:

$$\min E, s.t. E(D,O;I) = E_d(D,O;I) + E_s(D,O;I) + E_v(D,O;I) \quad (3)$$

where $E_d(D,O;I)$ is data in the binocular vision image, $E_s(D,O;I)$ is a smoothing parameter, and $E_v(D,O;I)$ describes a visibility feature of three-dimensional data.

It is defined that $$E_d(D, O; I) = \sum_x \left( E_{d_1}(D, O; I) \cdot P_F^f(x) + E_{d_2}(D, O; I) \cdot P_B^f(x) \right) \quad (4)$$

where $E_d^1(D,O;I)$ is an energy function of a foreground region or refined dynamic regions, $E_{d_2}(D,O;I)$ is used for providing a background region or refined static regions, and $P_F^f(x)$ and $P_B^f(x)$ respectively represent a probability of facial pixel x in the foreground region (or dynamic regions) and the background region (or static regions).

$$P_F^f(x) = \begin{cases} S(x), & \text{if } Dis(x) > T_b \\ P_F(x)/(P_F(x)+P_B(x)), & \text{otherwise} \end{cases} \quad (5)$$

where $P_F(x)$ is a foreground probability, $P_B(x)$ is a background probability, S is a foreground region mapping, Dis(x) is a Euclidean distance from facial pixels x to a segmentation edge, and Tb is a preset threshold.

$P_B^f(x)$ is calculated according to the following formula:

$$P_B^f(x) = 1 - P_F^f(x) \quad (6)$$

Therefore, $E_d(D,O;I)$ may be further expressed as follows:

$$E_d(D, O; I) = \sum_x \frac{1}{Z_n(x)} \begin{pmatrix} O_L(x)O_R(x)\eta + (1-O_L(X))(1+O_R(x))\rho(x, D(x); I_L) + \\ (1-O_R(x))(1+O_L(x))\rho(x, D(x); I_R) \end{pmatrix} \quad (7)$$

where $I_L$ is the left-side vision image, $I_R$ is the right-side vision image, $\rho(x, D(x); I)$ describes the robustness of the matching cost between facial pixel x and the difference, $Z_n(x)$ is a normalized parameter of the matching cost of each facial pixel x, and the matching cost η is used for quantizing a ratio of occlusion to the entire image.

It is defined that $$E_s(D, O; I) = \sum_x \sum_{y \in N(x)} \lambda(x, y) \rho_s(D(x), D(y)) \quad (8)$$

so as to effectively reflect local smoothness in the reconstructed facial depth image.

N(x) is a set of neighboring pixels of facial pixel x, λ(x, y) is a discontinuity factor consistent with a mutation, p is defined as a robustness formula of $\rho_s(D(x),D(y))=\min(|D(x)-D(y)|,T)$, and T is used for controlling a cost ceiling.

After the facial depth value D is calculated, the optimization processing unit 835 obtains the reconstructed refined depth result Z by using the camera calibration parameter, that is:

$$Z = \frac{F \cdot b}{D} \quad (9)$$

where F is a focal length of the camera, and b is a baseline distance of the camera.

Excellent performance of three-dimensional face reconstruction is obtained with reference to the prior information, and the three-dimensional face reconstruction can be accurately implemented even in a case with a poor lighting condition and occlusion; the stability and speed of the three-dimensional face recognition are improved.

The facial depth image forming unit 837 is configured to form the facial depth image of the binocular vision image pair according to the rough depth result and the refined depth result.

In this embodiment, the facial depth image forming unit 837 obtains, according to the rough depth result and refined depth result, a facial depth image in which a refined key facial region is extracted from the occlusion and a complex background.

Through the foregoing reconstruction of the facial depth image, the three-dimensional face is reproduced in a stereo manner, which provides a basis for authentic reflection of a geometric result of the input face.

In an embodiment, the system described above further includes a facial segmentation module. The facial segmentation module is configured to perform facial segmentation on the facial depth image according to a shape index value and a shape band, to obtain a plurality of facial regions.

In this embodiment, the shape index value and shape band are both shape parameters for representing a facial shape, where the shape index value is calculated according to a three-dimensional curvature, and the facial segmentation module performs the facial segmentation by using the shape index value and the shape band.

Specifically, the facial segmentation module uses the shape index value and shape band as salient shape features for segmentation to obtain different facial regions. For example, the facial segmentation module uses a shape band of an eye region as a search window, determines a position having a Gaussian curvature close to zero as an eye socket position, and searches for a rightmost position and a leftmost position by using the shape band, so as to extract a nose edge shaped like the groove of a saddle; a region above the eye is regarded as a forehead and blank region, a region from a left eye region to the mouth is regarded as a left cheek region, and a region from a right eye region to the mouth is regarded as a right cheek region.

Figure 18:
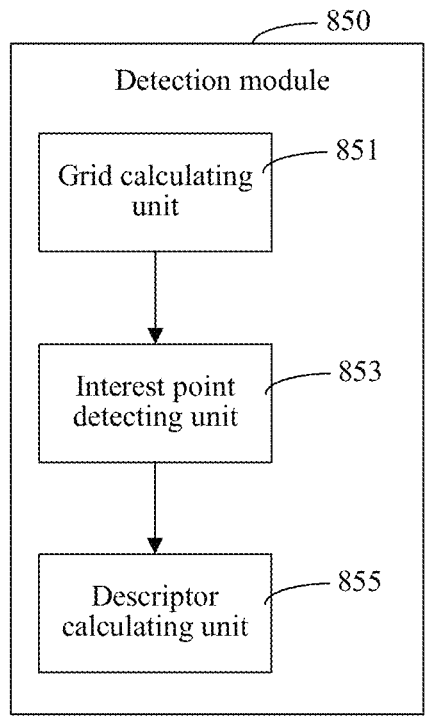
FIG. 18 is a schematic structural diagram of a detection module in FIG. 15.

As shown in FIG. 18, in an embodiment, the detection module 850 includes a grid calculating 851, an interest point detecting unit 853, and a descriptor calculating unit 855.

The grid calculating unit 851 is configured to perform calculation on the plurality of facial regions obtained during the facial segmentation, to obtain three-dimensional facial grids included in the facial regions.

In this embodiment, the grid calculating unit 851 uses the Delaunay algorithm to perform calculation on the plurality of facial regions obtained during the facial segmentation, to obtain three-dimensional facial grids included in the facial regions.

The interest point detecting unit 853 is configured to detect interest points in the three-dimensional facial grids.

In this embodiment, the interest point detecting unit 853 uses a Gaussian filter with an invariant density to calculate surface geometric shapes of the three-dimensional facial grids, so as to obtain interest points in the three-dimensional facial grids.

Specifically, the interest point detecting unit 853 detects interest points by using 8*8 three-dimensional facial grids as a set.

A difference of Gaussian scale-space, namely, a DOG function, is constructed by using 8*8-dimensional facial grids as a set, where a vertex thereof is $V_i^S$, and a vertex of a next set of 8*8 three-dimensional facial grids is $V_i^{S+1}$, that is:

$$V_i^{S+1} = \frac{1}{Vn_i^S} \sum_{v_j^S \in Vn_i^S} v_j^S \quad (10)$$

where $Vn_i^S$ represents that the first orders of a set of $V_i^S$ are neighboring each other, and $V_i^S$ are vertices with an invariant distance to each other.

The DoG function $d_i^S$ is calculated according to the following formula:

$$d_i^S = \frac{1}{\sigma_S^2}|v_i^S - v_i^{S+1}| \quad (11)$$

where $\sigma_S$ is a scale factor (width of the filter), and is calculated according to $$\sigma_S = \sqrt{N} D_i, \text{ and}$$

$$D_i = \frac{1}{Vn_i^S} \sum_{v_j^S \in Vn_j^S} |v_i^S - v_j^S|.$$

In this case, an obtained point with a maximum local scale, namely, a point with a maximum $d_i^S$ value, is the interest point.

The descriptor calculating unit 855 is configured to calculate, according to the pose parameter of the binocular vision image pair, local grid scale-invariant feature descriptors corresponding to the detected interest points.

In this embodiment, the descriptor calculating unit 855 calculates the local grid scale-invariant feature descriptor according to a gradient histogram of each interest point. The descriptor calculating unit 855 sets projection points in the x-y plane, y-z plane, and x-z plane for each detected interest point, and calculates a corresponding local grid scale-invariant feature descriptor according to three-dimensional gradient space and the pose parameter of the binocular vision image pair, as shown in FIG. 11, where $I_x$ is an x-axis coordinate corresponding to an x-y plane projection point or x-z plane projection point of an interest point, $I_y$ is a y-axis coordinate corresponding to the x-y plane projection point or a y-z plane projection point of the interest point, $D_z^y$ is a y-axis coordinate corresponding to the y-z plane projection point of the interest point, $D_z^x$ is a y-axis coordinate corresponding to the x-z plane projection point of the interest point, and parameters γ, α, and β are obtained according to the pose parameter.

Therefore, the image gradient in the horizontal direction and the vertical direction can be according to the following formula:

$$I_x = \nabla_x(I) = \frac{\partial I}{\partial x}, I_y = \nabla_y(I) = \frac{\partial I}{\partial y} \qquad (12)$$

$$D_x = \nabla_x(D) = \frac{\partial D}{\partial x}, D_y = \nabla_y(D) = \frac{\partial D}{\partial y}$$

where $\frac{\partial(\cdot)}{\partial x}$ and $\frac{\partial(\cdot)}{\partial y}$ are a gradient in the x direction and a gradient in the y direction, respectively, and further, the calculated image gradients serve as the local grid scale-invariant feature descriptor.

As shown in FIG. 11, in each three-dimensional facial grid, an arrow direction represents a gradient direction of a facial pixel in the three-dimensional facial grid, and an arrow length a gradient modulus value. In 8*8 three-dimensional facial grids, 4*4 three-dimensional facial grids are used to calculate accumulated values in eight gradient directions, to draw a histogram in each direction, thereby forming a seed point, where one interest point is formed by a total of four (2*2) seed points, each seed point is a set of 8-dimensional vectors, and 8-dimensional vectors corresponding to the four seed points form the local grid scale-invariant feature descriptor of the interest point; due to its characteristic of gradient direction distribution, the local grid scale-invariant feature descriptor of the interest point is invariant to rotation.

The calculated local grid scale-invariant feature descriptor can effectively handle the massing data degradation caused by extreme poses, occlusion and illumination, thereby ensuring the accuracy.

Figure 19:
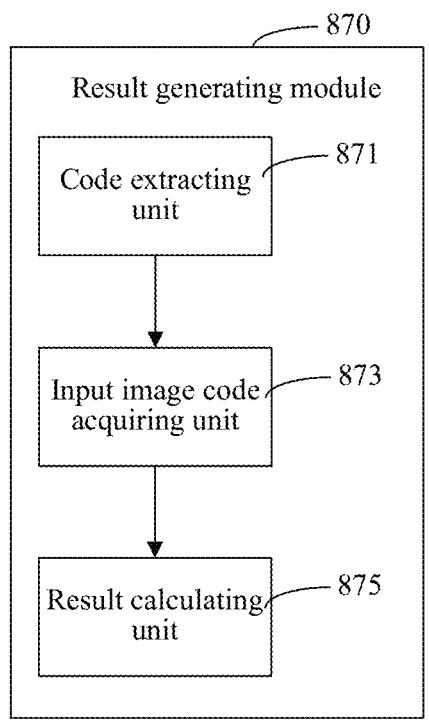
FIG. 19 is a schematic structural diagram of a result generating module in FIG. 15.

As shown in FIG. 19, in an embodiment, the result generating module 870 includes a code unit 871, an input image code acquiring unit 873, and a result calculating unit 875.

The code extracting unit 871 is configured to acquire the training data having attached category annotations, and extract, from the training data having attached category annotations, visual code corresponding to each sample.

In this embodiment, the training data includes samples of a plurality of users and a category annotation attached to each sample, where a local grid scale-invariant feature descriptor is used to describe a sample, and the code extracting unit 871 quantizes the local grid scale-invariant feature descriptor to obtain visual code corresponding to the sample; therefore, each sample has corresponding visual code, and by using the visual code corresponding to the samples, the plurality of samples is compared with a currently input binocular vision image pair.

The input image code acquiring unit 873 is configured to obtain, according to the detected grid scale-invariant feature descriptor, visual code representing the binocular vision image pair.

In this embodiment, the input image code acquiring unit 873 quantizes the local grid scale-feature descriptor corresponding to the interest point detected in the binocular vision image pair, to obtain corresponding visual code.

The result calculating unit 875 is configured to perform calculation on the visual code to the binocular vision image pair and the visual code corresponding to each sample, and generate the recognition result of the binocular vision image pair according to a calculation result.

In this embodiment, the result calculating unit 875 calculates a similarity between the visual code of the binocular vision image pair and the visual code corresponding to each sample, to obtain a sample most similar to the binocular vision image pair, and generates the recognition result according to the category annotation corresponding to this sample.

Figure 20:
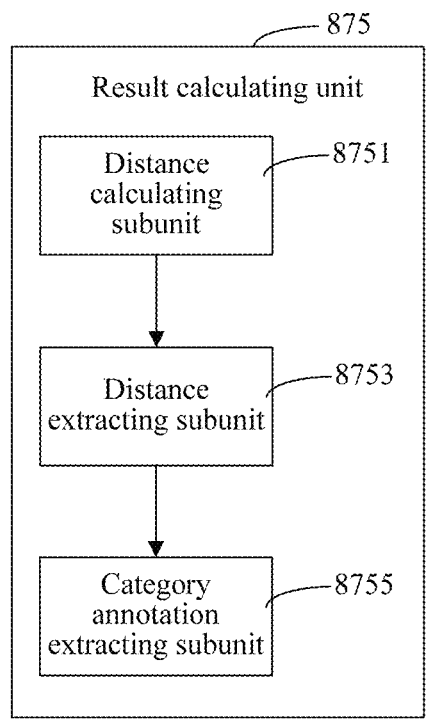
FIG. 20 is a schematic structural diagram of a result calculating unit in FIG. 19.

As shown in FIG. 20, in an embodiment, the result calculating unit 875 includes a distance calculating subunit 8751, a distance extracting subunit 8753, and a category annotation extracting 8755.

The distance calculating subunit 8751 is configured to calculate a Euclidean distance between the visual code of the binocular vision image pair and the visual code corresponding to each sample.

In this embodiment, because the visual code of the binocular vision image pair and the visual code corresponding to each sample are both values of quantized local grid scale-invariant feature descriptors, the distance calculating subunit 8751 calculates the Euclidean distance between the visual code of the binocular vision image pair and the visual code corresponding to each sample on the basis of the visual code of the binocular vision image pair and the visual code corresponding to each sample.

The distance extracting subunit 8753 is configured to extract a minimum Euclidean distance the calculated Euclidean distances.

In this embodiment, a plurality of Euclidean distances is calculated, where the Euclidean distance represents the similarity between the binocular vision image pair and the sample, that is, a greater Euclidean distance indicates a lower similarity between the binocular vision image pair and the sample, and a smaller Euclidean distance indicates a higher similarity between the binocular vision image pair and the sample.

Based on this, the distance extracting subunit 8753 extracts a smallest Euclidean distance from the plurality of calculated Euclidean distances.

The category annotation extracting subunit 8755 is configured to acquire visual code to a sample having the minimum Euclidean distance, and extract a category annotation attached to the visual code, the extracted category annotation being the recognition result of the binocular vision image pair.

In an embodiment, the system described above further includes a sample construction module. The sample constructing module is configured to construct, by using the local grid scale-invariant feature descriptor, a category annotation and visual code that use a binocular vision image pair of a new user as a sample.

In this embodiment, when a new user is added, the sample constructing module needs to a sample corresponding to the new user to the training data and attach a category annotation to the sample.

Specifically, after the interest point in the binocular vision image pair and the local grid scale-feature descriptor corresponding to the interest point are detected by using the input image processing module 810, the image reconstruction module 830, and the detection module 850, the local grid scale-invariant feature descriptor is quantized, so as to obtain a sample of a new user, a category annotation attached to the sample, and visual code.

Figure 21:
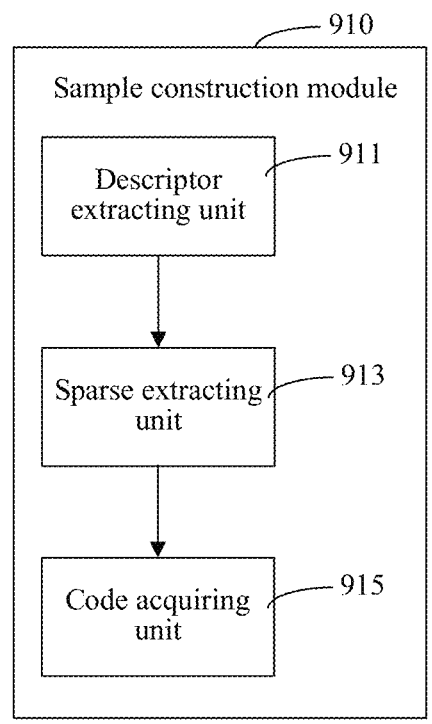
FIG. 21 is a schematic structural diagram of a sample construction module in an embodiment.

As shown in FIG. 21, in an embodiment, the foregoing sample construction module 910 includes a descriptor extracting unit 911, a sparse extracting unit 913, and a code acquiring unit 915.

The descriptor extracting unit 911 is configured to extract a set of local grid scale-invariant descriptors by using the binocular vision image pair of the new user as a sample, and set a corresponding category annotation.

In this embodiment, the descriptor extracting unit 911 extracts N D-dimensional local features, namely, local grid scale-invariant feature descriptors of D dimensions, from the binocular vision image pair of the new user, and are denoted by $L=[l_1, l_2, \ldots, l_N] \in R^{D \times N}$.

The sparse extracting unit 913 is configured to obtain a sparse representation of the set of extracted local grid scale-invariant feature descriptors according to a coefficient histogram of the sample.

In this embodiment, the sparse extracting unit 913 calculates the sparse of the set of extracted local grid scale-invariant feature descriptors according to the coefficient histogram of the sample; specifically, it is defined that $C=[c_1, c_2, \ldots, c_N] \in R^M$ is the sparse representation of L, and the corresponding sparse representation is obtained by solving the following optimization problem:

$$\min_C // L - BC //_F^2, \qquad (13)$$
$$\text{s.t.} // c_i // \leq k, \forall i$$

where B is a constructed visual vocabulary book, it is defined that $B=[b_1, b_2, \ldots, b_M] \in R^{D \times M}$, and B is a set of over-complete bases in the D-dimensional space, $//\bullet//_F$ is the Frobenius norm, $//\bullet//_0$ is a $l_0$ norm obtained by counting non-zero elements, and a sparse coefficient of a vector $c_i \in C$ is related to a specified category.

Therefore, the sparse extracting unit 913 uses the coefficient histogram to perform calculation on the sample of each user, that is, the sparse representation of the local grid scale-invariant feature descriptors is calculated according to $$h_j = \frac{1}{N} \sum_{i=1}^{N} c_i.$$

$c_i \in R^M$ is the $i^{th}$ local grid scale-invariant feature descriptor of $C \in R^{M \times N}$, N is the total number of local grid scale-invariant feature descriptors in a sample, and $h_j \in R^M$.

The code acquiring unit 915 is configured to obtain, according to the sparse of the set of local grid scale-invariant feature descriptors and the set of extracted local grid scale-invariant feature descriptors, visual code for describing the sample.

In this embodiment, after the sparse representation of the set of extracted local grid scale-feature descriptors is calculated, the code acquiring unit 915 solves the foregoing optimization problem, namely, formula (13), to obtain a corresponding visual vocabulary book, and further obtain visual code corresponding to the sample of the new user.

The sparse representation of local grid scale-invariant feature descriptors represents, by using a sparse constraint method, a mapping from the local grid scale-invariant feature descriptors to a feature space of the visual vocabulary book, so as to represent features effectively.

Further, in the visual vocabulary book, each sample is encoded by using a coefficient histogram to obtain corresponding visual code, so as to facilitate a subsequent facial recognition process.

The foregoing three-dimensional facial recognition system is implemented by learning grid scale-invariant feature descriptors to construct a visual vocabulary book for virtual sparse representation, and therefore, can effectively avoid impact from self-occlusion, has an extremely high recognition speed, is less complex, and is easier to implement.

With the local grid scale-invariant feature descriptors, each facial shape feature can be captured, and three-dimensional geometrical information can be drawn in a valid facial region, namely, a key facial region, thereby achieving desirable robustness and consistency in identity recognition.

Figure 22:
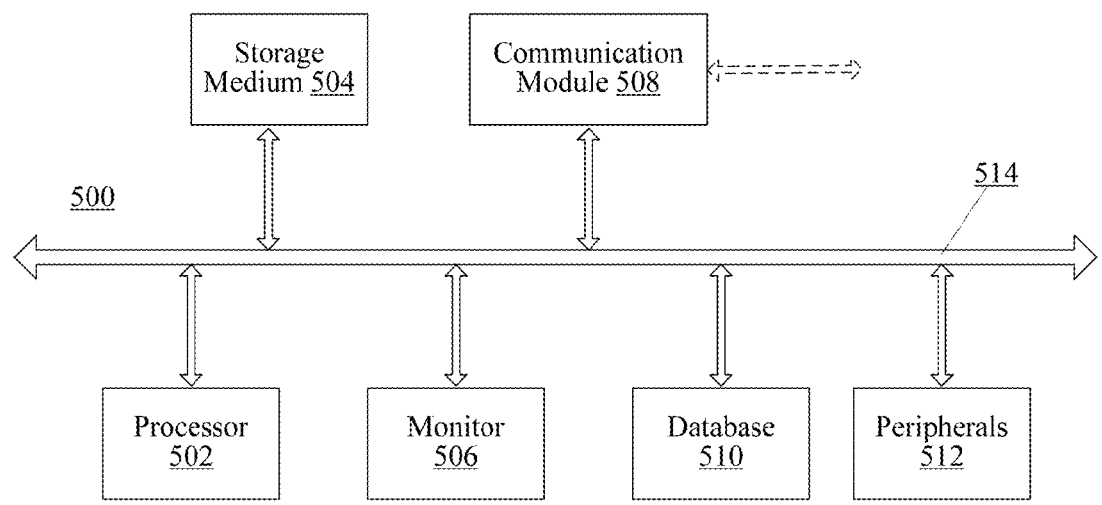
FIG. 22 illustrates a block diagram of an exemplary computer system consistent with the disclosed embodiments.

The disclosed computing device, the disclosed three-dimensional facial recognition system, and/or various disclosed modules and units may be implemented using one or more computing systems. FIG. 22 illustrates an exemplary computing system.

As shown in FIG. 22, a computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., learning features from the training samples, collecting binocular visual image pair of a user's face through a stereo camera, processing the binocular visual image pair to obtain its LMSIFT descriptor, comparing the LMSIFT descriptor with those in training samples to find a mostly matching sample and identify the user identity accordingly), when executed by the processor 502.

The units, sub-units, and modules in the present disclosure may include computer instructions stored in storage medium 504. When executed by the processor 502, the computer instructions may perform facial recognition functions describe in relation to FIGS. 15-21.

The monitor 506 may include display devices for displaying contents in the computing system 500, e.g. displaying, on a user interface, a recognition result (e.g., a recognized user identity based on the input binocular vision image pair and existing user profiles) by implementing the disclosed method. The peripherals 512 may include I/O devices, e.g., touchscreen, keyboard and mouse for inputting information by a user. The peripherals may also include certain sensors, such as a stereo camera, an RGB camera, a depth camera, etc.

Further, the communication module 508 may include network devices for establishing connections through a communication network such as Internet or other types of computer networks or telecommunication networks, either wired or wireless. The database 510 may include one or more databases for storing certain data (e.g., training samples associated with a plurality of users and their corresponding LMSIFT descriptors, 3D facial reference model, etc.) and for performing certain operations on the stored data.

In operation, the computing system 500 may acquire a binocular vision image pair of a user's face obtained by the camera 512 or transmitted from another device through the communication module 508, implement the disclosed method to authenticate the user's identity based on the training samples, and display the authentication/identification result on the monitor 506. The disclosed method and system may be applied in various security applications and control applications, such as cell phone security access, office access security check, providing personalized services based on user profile associated with the recognized user identity, etc.

A person of ordinary skill in the art may understand that all or a part of the processes of the method according to the embodiments of the present invention may be implemented by a program relevant hardware. The program may be stored in a computer readable storage medium. When the program is run, the processes of the method according to the embodiments of the present invention may be performed. The storage medium may be a magnetic disk, an optical disc, a read-only memory (ROM) or a random access memory (RAM).

The foregoing embodiments only describe several implementation manners of the present, and the description thereof is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A three-dimensional facial recognition method, comprising the following steps:
    performing pose estimation on an input binocular vision image pair by using a three-dimensional facial reference model, to obtain a pose parameter and a virtual image pair of the three-dimensional facial reference model with respect to the binocular vision image pair;
    reconstructing a facial depth image of the binocular vision image pair by using the virtual image pair as prior information;
    detecting, according to the pose parameter, a local grid scale-invariant feature descriptor corresponding to an interest point in the facial depth image; and
    generating a recognition result of the binocular vision image pair according to the detected local grid scale-invariant feature descriptor and training data having attached category annotations.

2. The method according to claim 1, wherein the step of performing pose estimation on an input binocular vision image pair by using a three-dimensional facial reference model, to obtain a pose parameter and a virtual image pair of the three-dimensional facial reference model with respect to the binocular vision image pair comprises:
    acquiring the input binocular vision image pair;
    projecting the three-dimensional facial reference model to obtain a virtual image pair having a same pose as the binocular vision image pair; and
    performing pose estimation according to the three-dimensional facial reference model and the virtual image pair to obtain a pose parameter of the input binocular vision image pair.

3. The method according to claim 1, wherein the step of reconstructing a facial depth image of the binocular vision image pair by using the virtual image pair as prior information comprises:
    computing facial parallax values according to correspondences between the binocular vision image pair and the virtual image pair;
    combining the facial parallax values with a camera calibration parameter used for taking the binocular vision image pair, to obtain a rough depth result;
    obtaining an occlusion information of facial pixels in the binocular vision image pair by using the virtual image pair as prior information, and performing optimization processing according to the occlusion information of the facial pixels, to obtain a refined depth result; and
    forming the facial depth image of the binocular vision image pair according to the rough depth result and the refined depth result.

4. The method according to claim 1, wherein before the step of detecting, according to the pose parameter, a local grid scale-invariant feature descriptor corresponding to an interest point in the facial depth image, the method further comprises:
    performing facial segmentation on the facial depth image according to shape index values and shape bands, to obtain a plurality of facial regions.

5. The method according to claim 4, wherein the step of detecting, according to the pose parameter, a local grid scale-invariant feature descriptor corresponding to an interest point in the facial depth image comprises:
    performing calculation on the plurality of facial regions obtained during the facial segmentation, to obtain three-dimensional facial grids comprised in the facial regions;
    detecting the interest points in the three-dimensional facial grids; and
    calculating, according to the pose parameter of the binocular vision image pair, local grid scale-invariant feature descriptors corresponding to the detected interest points.

6. The method according to claim 1, wherein the step of generating a recognition result of the binocular vision image pair according to the detected local grid scale-invariant feature descriptor and training data having attached category annotations comprises:
    acquiring the training data having attached category annotations, and extracting, from the training data having attached category annotations, visual code corresponding to each sample;
    obtaining, according to the detected local grid scale-invariant feature descriptor, visual code representing the binocular vision image pair; and
    performing calculation on the visual code corresponding to the binocular vision image pair and the visual code corresponding to each sample, and generating the recognition result of the binocular vision image pair according to a calculation result.

7. The method according to claim 6, wherein the step of performing calculation on the visual code corresponding to the binocular vision image pair and the visual code corresponding to each sample, and generating the recognition result of the binocular vision image pair according to a calculation result comprises:
    calculating a Euclidean distance between the visual code of the binocular vision image pair and the visual code corresponding to each sample;

extracting a minimum Euclidean distance from the calculated Euclidean distances; and acquiring visual code corresponding to a sample having the minimum Euclidean distance, and extracting a category annotation attached to the visual code, the extracted category annotation being the recognition result of the binocular vision image pair.

8. The method according to claim 6, wherein before the step of generating a recognition result of the binocular vision image pair according to the detected local grid scale-invariant feature descriptor and training data having attached category annotations, the method further comprises:

constructing, by using the local grid scale-invariant feature descriptor, a category annotation and visual code that use a binocular vision image pair of a new user as a sample.

9. The method according to claim 8, wherein the step of constructing, by using the local grid scale-invariant feature descriptor, a category annotation and visual code that use a binocular vision image pair of a new user as a sample comprises:

extracting a set of local grid scale-invariant feature descriptors by using the binocular vision image pair of the new user as a sample, and setting a corresponding category annotation;

obtaining a sparse representation of the set of extracted local grid scale-invariant feature descriptors according to a coefficient histogram of the sample; and obtaining, according to the sparse representation of the set of local grid scale-invariant feature descriptors and the set of extracted local grid scale-invariant feature descriptors, visual code for describing the sample.

10. A three-dimensional facial recognition system, comprising:

an input image processing module, configured to perform pose estimation on an input binocular vision image pair by using a three-dimensional facial reference model, to obtain a pose parameter and a virtual image pair of the three-dimensional facial reference model with respect to the binocular vision image pair;

an image reconstruction module, configured to reconstruct a facial depth image of the binocular vision image pair by using the virtual image pair as prior information;

a detection module, configured to detect, according to the pose parameter, a local grid scale-invariant feature descriptor corresponding to an interest point in the facial depth image; and a result generating module, configured to generate a recognition result of the binocular vision image pair according to the detected local grid scale-invariant feature descriptor and training data having attached category annotations.

11. The system according to claim 10, wherein the input image processing module comprises:

an image acquiring unit, configured to acquire the input binocular vision image pair;

a projection unit, configured to project the three-dimensional facial reference model to obtain a virtual image pair having a same pose as the binocular vision image pair; and a pose estimation unit, configured to perform pose estimation according to the three-dimensional facial reference model and the virtual image pair to obtain a pose parameter of the input binocular vision image pair.

12. The system according to claim 10, wherein the image reconstruction module comprises:

a parallax computing unit, configured to compute facial parallax values according to correspondences between the binocular vision image pair and the virtual image pair;

a rough depth calculating unit, configured to combine the facial parallax values with a camera calibration parameter used for taking the binocular vision image pair, to obtain a rough depth result;

an optimization processing unit, configured to obtain an occlusion information of facial pixels in the binocular vision image pair by using the virtual image pair as prior information, and perform optimization processing according to the occlusion information of the facial pixels, to obtain a refined depth result; and a facial depth image forming unit, configured to form the facial depth image of the binocular vision image pair according to the rough depth result and the refined depth result.

13. The system according to claim 10, wherein the system further comprises:

a facial segmentation module, configured to perform facial segmentation on the facial depth image according to shape index values and shape bands, to obtain a plurality of facial regions.

14. The system according to claim 13, wherein the detection module comprises:

a grid calculating unit, configured to perform calculation on the plurality of facial regions obtained during the facial segmentation, to obtain three-dimensional facial grids comprised in the facial regions;

an interest point detecting unit, configured to detect the interest points in the three-dimensional facial grids; and a descriptor calculating unit, configured to calculate, according to the pose parameter of the binocular vision image pair, local grid scale-invariant feature descriptors corresponding to the detected interest points.

15. The system according to claim 10, wherein the result generating module comprises:

a code extracting unit, configured to acquire the training data having attached category annotations, and extract, from the training data having attached category annotations, visual code corresponding to each sample;

an input image code acquiring unit, configured to obtain, according to the detected local grid scale-invariant feature descriptor, visual code representing the binocular vision image pair; and a result calculating unit, configured to perform calculation on the visual code corresponding to the binocular vision image pair and the visual code corresponding to each sample, and generate the recognition result of the binocular vision image pair according to a calculation result.

16. The system according to claim 15, wherein the result calculating unit comprises:

a distance calculating subunit, configured to calculate a Euclidean distance between the visual code of the binocular vision image pair and the visual code corresponding to each sample;

a distance extracting subunit, configured to extract a minimum Euclidean distance from the calculated Euclidean distances; and a category annotation extracting subunit, configured to acquire visual code corresponding to a sample having the minimum Euclidean distance, and extract a category annotation attached to the visual code, the extracted category annotation being the recognition result of the binocular vision image pair.

17. The system according to claim 15, wherein the system further comprises:
- a sample construction module, configured to construct, by using the local grid scale-invariant feature descriptor, a category annotation and visual code that use a binocular vision image pair of a new user as a sample.

18. The system according to claim 17, wherein the sample construction module comprises:
- a descriptor extracting unit, configured to extract a set of local grid scale-invariant feature descriptors by using the binocular vision image pair of the new user as a sample, and set a corresponding category annotation;
- a sparse extracting unit, configured to obtain a sparse representation of the set of extracted local grid scale-invariant feature descriptors according to a coefficient histogram of the sample; and
- a code acquiring unit, configured to obtain, according to the sparse representation of the set of local grid scale-invariant feature descriptors and the set of extracted local grid scale-invariant feature descriptors, visual code for describing the sample.

* * * * *

UNITED STATES PATENT AND TRADEMARK OFFICE
CERTIFICATE OF CORRECTION

PATENT NO. : 9,858,472 B2
APPLICATION NO. : 15/212410
DATED : January 2, 2018
INVENTOR(S) : Yue Ming et al.

Page 1 of 1

It is certified that error appears in the above-identified patent and that said Letters Patent is hereby corrected as shown below:

On the Title Page

Item (72),
After "Yue Ming," and before "(CN)" change "Shenzhen" to --Beijing--.
After "Jie Jiang," and before "(CN)" change "Shenzhen" to --Beijing--.
After "Tingting Liu," and before "(CN)" change "Shenzhen" to --Beijing--.
After "Juhong Wang," and before "(CN)" change "Shenzhen" to --Beijing--.

Signed and Sealed this
Ninth Day of October, 2018

Andrei Iancu
*Director of the United States Patent and Trademark Office*